United States Patent [19]

Okamura

[11] Patent Number: 5,497,190
[45] Date of Patent: Mar. 5, 1996

[54] DIGITAL TO ANALOG CONVERTER ARITHMETIC CIRCUIT

[75] Inventor: Masahiko Okamura, Osaka, Japan

[73] Assignee: Matsushita Electric Industrial Co., Ltd., Osaka, Japan

[21] Appl. No.: 271,300

[22] Filed: Jul. 6, 1994

[30] Foreign Application Priority Data

Jul. 7, 1993 [JP] Japan .................................. 5-167971

[51] Int. Cl.⁶ .............................. H04N 5/44; H04N 9/73
[52] U.S. Cl. ............................ 348/189; 348/572; 348/673
[58] Field of Search ...................................... 348/730, 731, 348/734, 86, 87, 180, 189, 190, 572, 571, 678, 683, 686, 687, 673; 379/100; H04N 17/00, 17/02, 5/44, 9/73

[56] References Cited

U.S. PATENT DOCUMENTS

| | | | |
|---|---|---|---|
| 4,272,837 | 6/1981 | Ueda et al. | 368/80 |
| 4,309,627 | 1/1982 | Tabata | 307/362 |
| 4,658,301 | 4/1987 | Toyoda et al. | 379/100 |
| 4,831,458 | 3/1989 | Watanable | 358/280 |

FOREIGN PATENT DOCUMENTS

| | | |
|---|---|---|
| 61-95629 | 5/1986 | Japan . |
| 1-138856 | 5/1989 | Japan . |
| 4-286492 | 10/1992 | Japan . |

*Primary Examiner*—James J. Groody
*Assistant Examiner*—Glenton B. Burgess
*Attorney, Agent, or Firm*—Panitch Schwarze Jacobs & Nadel

[57] ABSTRACT

In a DAC-output circuit of a TV set, an output judging part lowers a multiplying factor of sub-data as user data come close to zero, to converge the output onto zero in accordance with the turning down of the user data.

4 Claims, 4 Drawing Sheets

DIGITAL TO ANALOG CONVERTER ARITHMETIC CIRCUIT

FIELD OF THE INVENTION AND RELATED ART STATEMENT

1. Field of the Invention

The present invention relates to a DAC (Digital-to-Analog Converter) output arithmetic circuit used in a TV set etc.

2. Description of the Related Art

In recent years, there has been an insatiable need of providing an audio-visual apparatus with high convenience in its functions. The audio-visual apparatus has a user data part which is adjustable by the user. With the progress of digital processing technology, an output of the user data part was transmitted in the form of digital data via a serial communication line.

FIG. 4 is a block diagram showing a block configuration of the conventional DAC-output arithmetic circuit. In FIG. 4, information of a user data part 5 and information of a sub-data part 6 are input to an output judging part 7. An output circuit 8 issues an output in response to an output issued from the output judging part 7.

When each of several user's data such as volume, tone, color density, hue, brightness, contrast and sharpness is given to the user data part 5, this data is input to the output judging part 7. The sub-data part 6 has sub-data for compensating irregularities in characteristics of IC. These sub-data are also input to the output judging part 7. The output judging part 7 makes a sum of the user data and the sub-data, and a resultant output value is forwarded to an output circuit 8. The output circuit 8 transmits the output value via a serial communication line (not shown).

However, even when the user lowers the user data to the minimum value (zero), sometimes an output sum value is not zero because the sub-data for compensating the irregularity of IC has a specific value other than zero. For example, although the user wants to kill the sound, volume level can not be made zero. Also, although the user wants to turn the TV to be monochromic, the color remains dimly. Thus, in the conventional TV set, control of the picture does not follow the way the user want it to.

OBJECT AND SUMMARY OF THE INVENTION

An object of the present invention is to offer a DAC-output arithmetic circuit which controls an output value just as the user demands.

In order to achieve the above-mentioned object, a DAC-output arithmetic circuit of the present invention comprises:

a user data part having user data adjustable by a user;

a sub-data part having sub-data for compensating irregularity in characteristic of IC;

an output judging part which adjusts the sub-data in response to values of the user data and issues output data based on the sub-data and the user data; and an output circuit for receiving and issuing the output data.

According to the present invention, when the user of a TV set adjusts the user data close to zero, the output data of the DAC-output circuit converges on zero. When the user adjusts the user data zero, the output data of the DAC-output circuit is also zero. Therefore, adjustments of volume, tone, color density, hue, brightness, contrast and sharpness are executed exactly as the user wishes.

While the novel features of the invention are set forth particularly in the appended claims, the invention, both as to organization and content, will be better understood and appreciated, along with other objects and features thereof, from the following detailed description taken in conjunction with the drawings.

DESCRIPTION OF THE PREFERRED EMBODIMENT

Hereafter, a preferred embodiment of the present invention is described with reference to the accompanying drawings.

Figure 1:
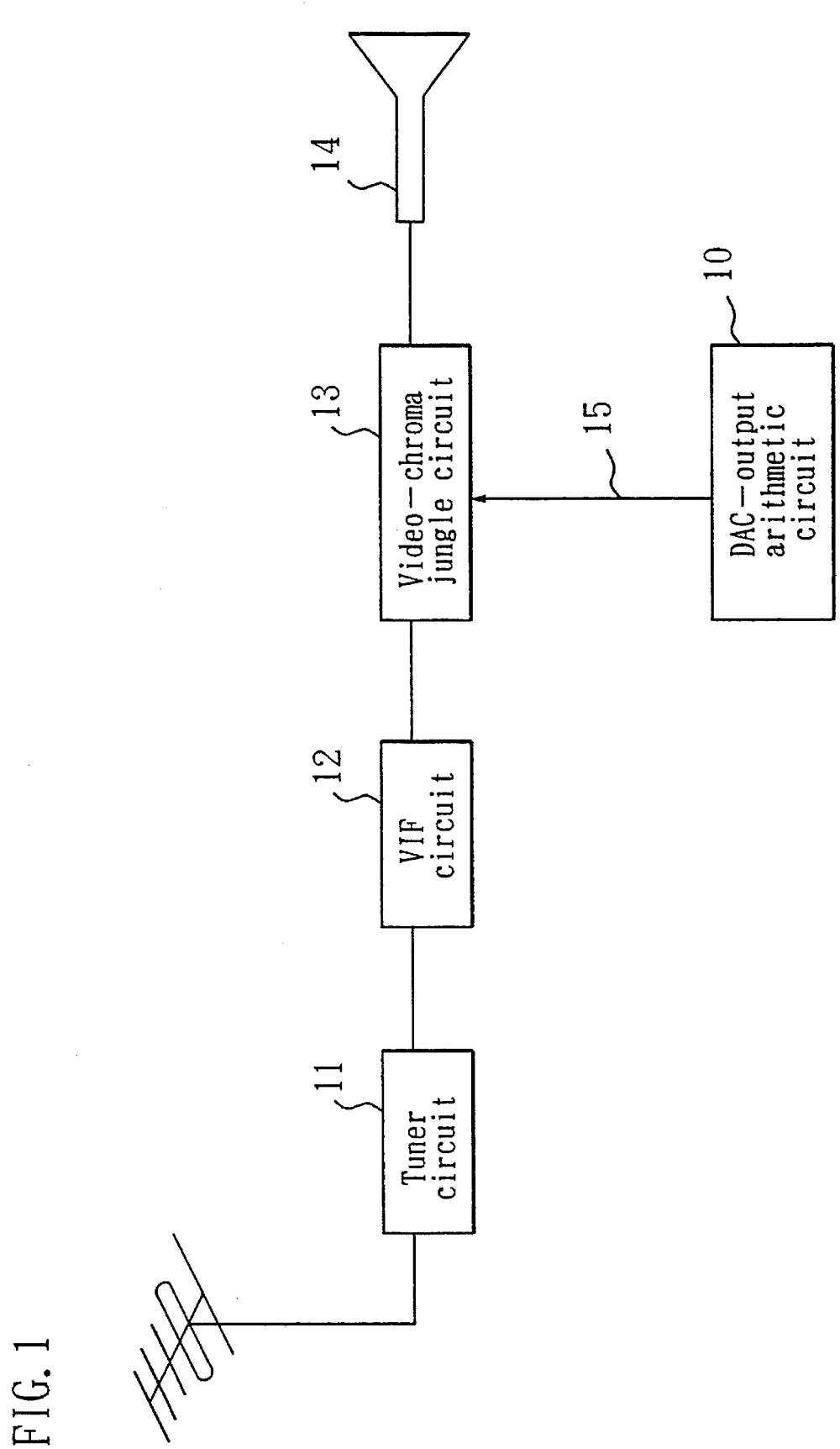
FIG. 1 is a block diagram showing a part of inner circuits for a TV set including a DAC-output arithmetic circuit 10 of the present invention.

FIG. 1 is a block diagram showing a part of inner circuits for a TV set. As shown in FIG. 1. TV signals are processed through a tuner circuit 11, a VIF circuit (Video Intermediate Frequency amplifier circuit) 12 and a video-chroma jungle circuit 13, and output video signals are displayed on a CRT 14. The video-chroma jungle circuit 13 receives control signals from a DAC-output arithmetic circuit 10 via a serial communication line 15 to thereby adjust the displaying condition for the CRT 14. The DAC-output arithmetic circuit 10 also controls audio signals of the TV signals.

Figure 2:
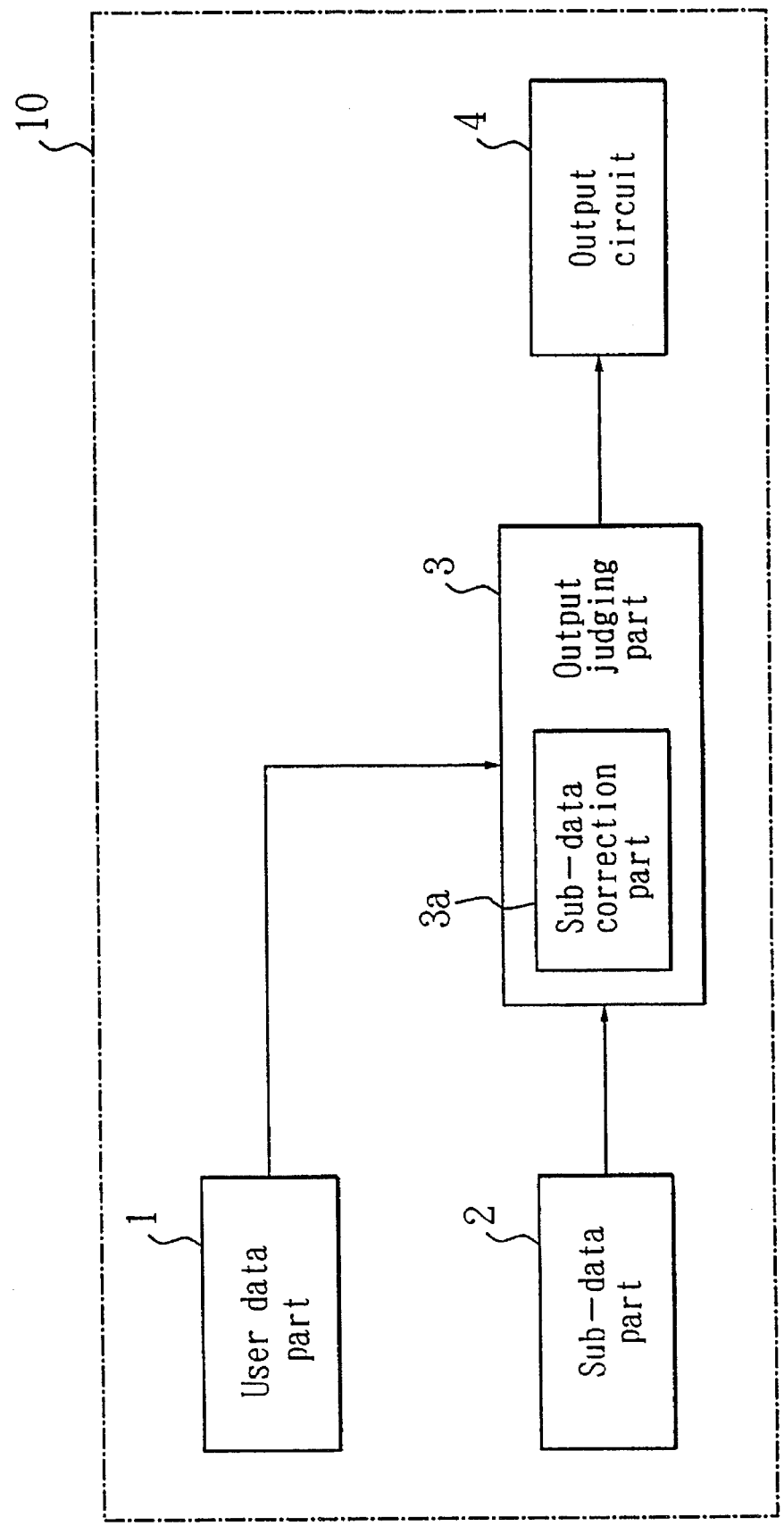
FIG. 2 is a block diagram showing a configuration of the DAC-output circuit of the present invention.

FIG. 2 is a block diagram showing a block configuration of the DAC-output arithmetic circuit 10 shown in FIG. 1. In FIG. 2. information of a user data part i and information of a sub-data part 2 are input to an output judging part 3. An output circuit 4 issues an output in response to an output issued from the output judging part 3.

When each of several user's data such as volume, tone, color density, hue, brightness, contrast and sharpness is given to the user data part 1, this data is input to the output judging part 3. The sub-data part 2 has sub-data for compensating irregularity in characteristics of IC. This sub-data is also input to the output judging part 3. The output judging part 3 includes a sub-data correction part 3a which is provided to lower the sub-data with specific multiplying factors in compliance with a predetermined flow chart shown in FIG. 3. The output judging part 3 calculates a desirable output value based on the user data and the sub-data. Typically, the above-mentioned block circuit configuration is realized by a microcomputer and necessary memories.

Figure 3:
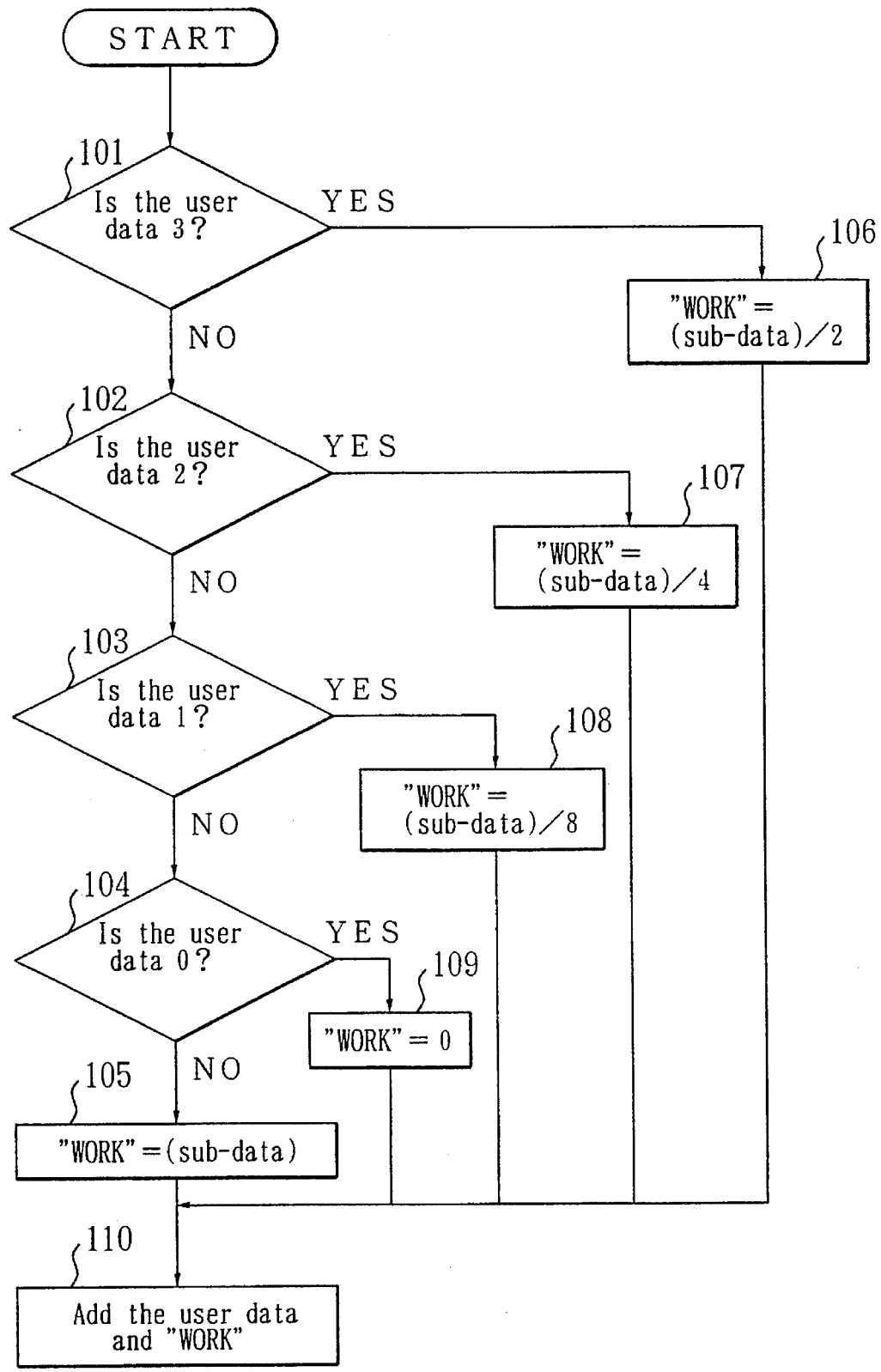
FIG. 3 is a flow chart showing Judging procedures of the DAC-output circuit of the present invention.
Figure 4:
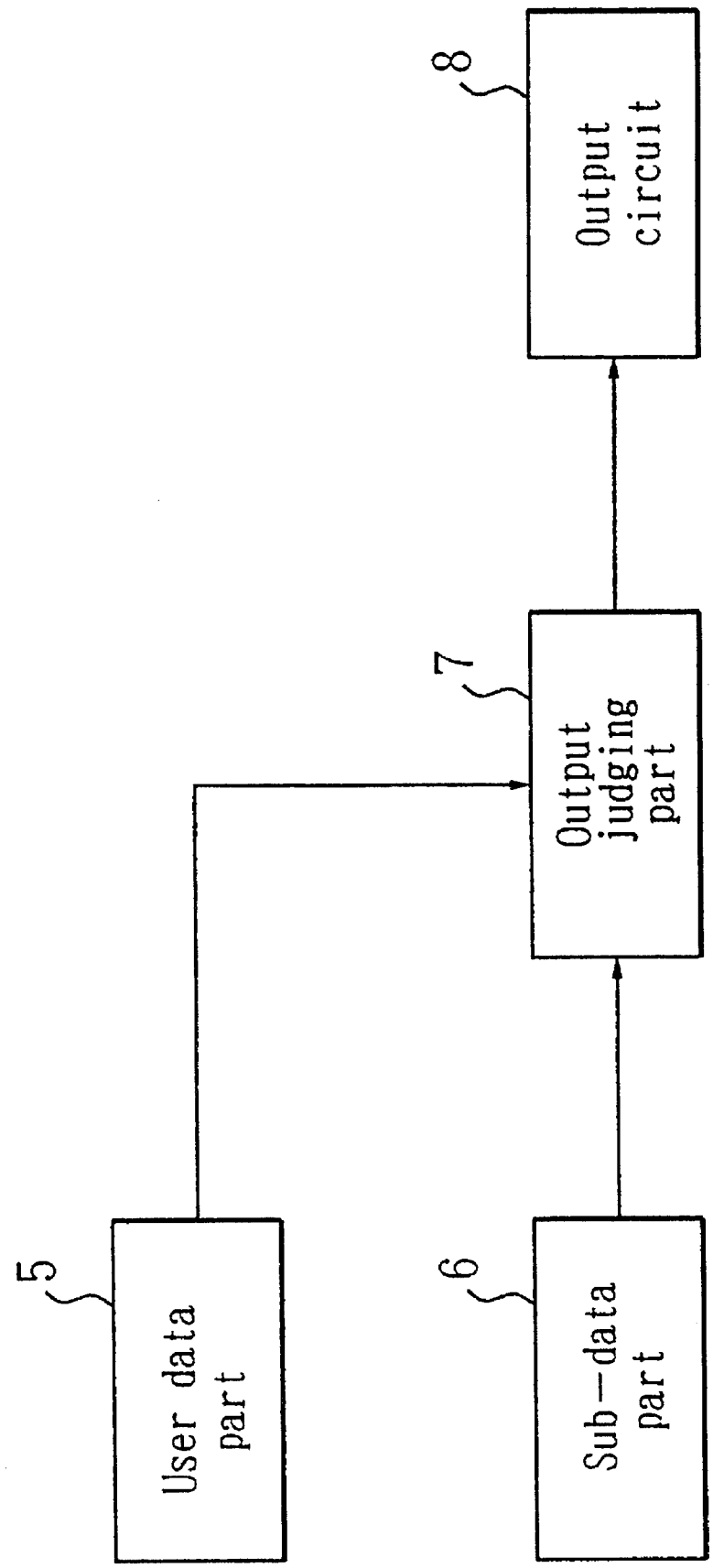
FIG. 4 is a block diagram showing the conventional configuration of the DAC-output circuit.

In FIG. 3, when the user data (e.g., 64-bit value) is larger than 3, step advances up to a step 105 is executed through steps 101,102, 103 and 104. At the step 105, a temporary memory value defined as "WORK" is set equal to the sub-data. Next, at a step 110, the user data is added to the value "WORK", and a resultant output value is issued to the output circuit 4 (FIG. 2) from the output judging part 3 (FIG. 2).

When the user data is 3, a step advance from the step 101 to a step 106 is executed. At the step 106, the value "WORK" is set equal to a half of the sub-data. Next, at the step 110, the user data is added to the value "WORK", and a resultant output value is issued to the output circuit 4 (FIG. 2) from the output judging part 3 (FIG. 2).

When the user data is 2, a step advance from the step 102 to a step 107 is executed. At the step 107, the value "WORK" is set equal to a quarter of the sub-data. Next, at the step 110, the user data is added to the value "WORK", and a resultant output value is issued to the output circuit 4 (FIG. 2) from the output judging part 3 (FIG. 2).

When the user data is 1, a step advance from the step 103 to a step 108 is executed. At the step 108, the value "WORK" is set equal to a value of ((sub-data)/8). Next, at the step 110, the user data is added to the value "WORK", and a resultant output value is issued to the output circuit 4 (FIG. 2) from the output judging part 3 (FIG. 2).

When the user data is 0, a step advance from the step 104 to a step 109 is executed. At the step 109, the value "WORK" is set zero. Next, at the step 110, the user data is added to the value "WORK", and a resultant output value is issued to the output circuit 4 (FIG. 2) from the output judging part 3 (FIG. 2).

In FIG. 2, the output circuit 4 transmits the output value via the serial communication line 15 (FIG. 1).

Apart from the above-mentioned embodiment wherein the output value converges on zero by diminishing weights of the sub-data with multiplying factors of ½, ¼ and ⅛, another embodiment may be such that the multiplying factors are, for example, ¾, 2/4 and ¼, respectively.

Also, though four-level (the user data are 3, 2, 1 and 0) data conversion is performed in the above-mentioned embodiment, five-level (the user data are 4, 3, 2, 1 and 0) or any other higher level can be applied.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

What is claimed is:

1. A DAC arithmetic circuit comprising:

a user data part having adjustable user data;

a sub-data part having sub-data for compensating for irregularities in characteristics of an IC;

an output judging part which includes a sub-data correction part for modifying said sub-data to reduce a value thereof in response to a decrease in said user data when said user data is below a predetermined value, said output judging part issuing output data based on said sub-data and said user data; and an output circuit for receiving and issuing said output data.

2. A DAC arithmetic circuit in accordance with claim 1, wherein said user data are of at least one of volume, tone color density, hue, brightness, contrast and sharpness.

3. A DAC arithmetic circuit comprising:

a user data part having at least one user adjustable data value;

a sub-data part having a preset sub-data value; and an output judging part for adding the at least one user adjustable value and the sub-data value and providing an output therefrom, wherein the output judging part includes a sub-data correction part for modifying the output judging part output when the user adjustable data value exceeds a predetermined value.

4. The DAC arithmetic circuit of claim 3 wherein when the at least one user data adjustable value is substantially equal to zero, the sub-data correction part modifies the output judging part output to also be substantially equal to zero.

\* \* \* \* \*